(12) United States Patent
Akao et al.

(10) Patent No.: US 12,076,807 B2
(45) Date of Patent: Sep. 3, 2024

(54) ELECTRODE DEVICE

(71) Applicant: SHINKOKIKI CO., LTD., Nagoya (JP)

(72) Inventors: Yasuo Akao, Nagoya (JP); Takaaki Murakami, Nagoya (JP)

(73) Assignee: Shinkokiki Co., Ltd., Nagoya (JP)

( * ) Notice: Subject to any disclaimer, the term of this patent is extended or adjusted under 35 U.S.C. 154(b) by 646 days.

(21) Appl. No.: 17/305,175

(22) Filed: Jul. 1, 2021

(65) Prior Publication Data

US 2021/0323084 A1 Oct. 21, 2021

Related U.S. Application Data

(63) Continuation of application No. PCT/JP2019/048864, filed on Dec. 13, 2019.

(30) Foreign Application Priority Data

Mar. 27, 2019 (JP) .................................. 2019-076668

(51) Int. Cl.
*B23K 11/30* (2006.01)
(52) U.S. Cl.
CPC .................... *B23K 11/3054* (2013.01)
(58) Field of Classification Search
CPC .............. B23K 11/3018; B23K 11/3054
USPC ........................................... 219/120
See application file for complete search history.

(56) References Cited

U.S. PATENT DOCUMENTS

| | | | | |
|---|---|---|---|---|
| 2,429,825 A | * | 10/1947 | Kruitbosch | B23K 11/31 251/335.1 |
| 3,109,087 A | * | 10/1963 | Larkworthy | B23K 11/3018 219/120 |
| 3,487,193 A | * | 12/1969 | Width | B23K 11/3045 219/120 |
| 5,378,868 A | * | 1/1995 | Burkhardt | B23K 11/36 219/86.31 |

(Continued)

FOREIGN PATENT DOCUMENTS

| | | |
|---|---|---|
| JP | 2000-210778 A1 | 8/2000 |
| JP | 2008-023593 A1 | 2/2008 |
| JP | 3148957 U | 3/2009 |

OTHER PUBLICATIONS

Chinese Office Action dated Sep. 2, 2022 (Application No. 201980092023.0).

(Continued)

*Primary Examiner* — Geoffrey S Evans
(74) *Attorney, Agent, or Firm* — BURR PATENT LAW, PLLC

(57) ABSTRACT

An electrode device for water-cooling type resistance welding that constantly circulates cooling water efficiently to the proximity of an electrode tip, allowing the electrode to stably cool down. A cooling pipe 11 is inserted inside a device body 1 from a lower side thereof, and cooling water ejected from a tip opening 11*a* of the cooling pipe 11 cools a cap tip 10 placed on the tip of a shank 8. The cooling pipe 11 is movable in the axial direction of the device body 1 and fixable at any position. As a result, even with a change in the length of the shank 8, the tip opening 11*a* of the cooling pipe 11 can always be positioned in the proximity of the cap tip 10, allowing the cap tip 10 to cool down reliably and the form of the electrode tip to be maintained stably for a long time.

2 Claims, 5 Drawing Sheets

(56) References Cited

U.S. PATENT DOCUMENTS

2006/0108329 A1   5/2006   Stevenson et al.

OTHER PUBLICATIONS

International Search Report and Written Opinion (Application No. PCT/JP2019/048864) dated Mar. 3, 2020.

* cited by examiner

ELECTRODE DEVICE

FIELD OF THE INVENTION

The present invention relates to an electrode device for resistance welding with a structure in which cooling with cooling water is performed.

BACKGROUND OF THE INVENTION

A main cause of welding failure in resistance spot welding is a decrease in current density due to wear and enlargement of the electrode tip. More specifically, the wear and enlargement of the tip increases the area in contact with the material to be welded, results in dissipating the current, decreasing the current density per unit area, and decreasing the amount of resistance heat, and thus constitutes the main cause of the welding failure.

It is well known that the Joule heat, which is the basis of the resistance welding, is proportional to the square of the current as expressed by: exothermic heating value Q=current×current×resistance×conduction time. When the diameter of the electrode tip is increased by 10%, the area is 1.21 times larger, and the current density drops to about 80%. According to the above formula, the amount of heat is reduced by almost 40% in the calculation. This results from the increase in the contact area between the electrode and the material to be welded. With a 40% reduction in the amount of heat, it is natural that welding failure occurs at the same current level as the one used when the tip is new.

As described above, keeping the form of the electrode tip as long as possible is an important factor in stably maintaining welding quality over a long period of time. For this reason, the electrode tip is cooled by circulating cooling water from inside the electrode tip to maintain the form of the electrode tip.

An electrode device of this type is found in the related art, in which, as shown in FIG. 6, a shank 52 is attached to a holder 51, a cap tip 53 is attached to the tip of the shank 52, and a cooling pipe 54 for the cap tip 53 is disposed inside the shank 52 (see, for example, Patent Literature 1).

CITATION LIST

Patent Literature

Patent Literature 1: Japanese Patent Application Laid-open No. 2008-23593

SUMMARY OF THE INVENTION

Technical Problems

In the technique described in Patent Literature 1, as the length of a shank 52 changes, a gap from the tip of a cooling pipe 54 to the inner face of the cap tip 53 changes. With the longer shank 52, the cooling performance is degraded because the gap from the tip of the cooling pipe 54 to the inner surface of the cap tip 53 increases. Many of the welding objects in field operations have large varieties and thus require frequent setting changes. The length of cooling pipe 54 inside the electrode, which includes the shank 52 and the cap tip 53, is usually not adjusted every time the setting is changed because the replacement process is tedious. Even when the electrode length is increased following the setting change, only the electrode is replaced. Thus, cooling water does not circulate efficiently to the proximity of the electrode tip, and the electrode tip wears and enlarges faster than expected, leading to a problem of unexpected welding failure.

The object of the present invention is to solve problems in the prior art, such as the one described above, and provide an electrode device that is capable of adjusting discretionally a position of a water-cooling end inside the electrode in a very simple manner, circulating cooling water efficiently to the proximity of the tip of the electrode, thereby maintaining the form of the electrode tip stably for a long period of time and reducing occurrence of welding failure.

Solution to Problems

An electrode device according to the present invention, which has been made to solve the above problem, includes: a device body that includes an electrode and a straight holder connected with each other in a straight line, the electrode including a cap tip placed on a tip of a shank having a cylindrical shape, the straight holder having a cylindrical shape; and a cooling pipe that is inserted inside the device body from a lower side of the device body and has a tip opening located proximate to the cap tip. Cooling water ejected from the tip opening of the cooling pipe cools the cap tip, flows through a gap between an outer peripheral surface of the cooling pipe and inner peripheral surfaces of the shank and the straight holder, and then is discharged outside from a lower part of the straight holder. The cooling pipe is installed so as to be movable in an axial direction of the device body and fixable at any position. This constitutes the invention according to claim 1.

According to a preferred embodiment, a cooling pipe support member provided with a supply port for the cooling water may be positioned at a lower part of the device body, and the cooling pipe support member may support a base end of the cooling pipe. This constitutes the invention according to claim 2.

According to another preferred embodiment, the cooling pipe support member may include: a base provided with a supply port for the cooling water and a cylindrical body erected on the base, in which the cylindrical body is inserted in the straight holder so as to be movable in an axial direction, and the cooling pipe support member is movable in the axial direction of the straight holder and fixable at any position by engaging a long groove portion provided on an outer peripheral wall of the cylindrical body with a locking bolt screwed on a side face of the straight holder. This constitutes the invention according to claim 3.

According to another preferred embodiment, the cooling pipe support member may include: a base provided with a supply port for the cooling water; and a fixing member that is fixed to a lower part of the straight holder separately from the base and that penetrates and supports the cooling pipe, in which the fixing member is provided with a discharge port for the cooling water, and the cooling pipe support member is movable in an axial direction of the straight holder and fixable at any position by providing a lock mechanism at a lower portion of the fixing member, the lock mechanism having a ring-type steel pipe joint structure that uses a compression ring fix the cooling pipe at any position. This constitutes the invention according to claim 4.

Advantageous Effects of Invention

With the invention according to claim 1, the cooling pipe is installed in the device body so as to be movable in the axial direction and fixable at any position, so that the cooling pipe can be moved and thereby always positions and fixes the tip thereof proximate to the inner surface of the electrode, even the lengths of shanks change. This allows the cooling water to circulate efficiently to the proximity of the electrode tip, thus maintains the form of the electrode tip stably for a long time, reducing the occurrence of welding failure.

With the invention according to claim 2, the cooling pipe support member provided with the supply port for the cooling water is positioned at the lower part of the device body, and the cooling pipe support member supports the base end of the cooling pipe, so that the tip of the cooling pipe can be easily adjusted to the position proximate to the inner surface of the electrode by adjusting the position of the cooling pipe support member.

With the invention according to claim 3, the cooling pipe support member includes the base provided with the supply port for the cooling water and the cylindrical body erected on the base, in which the cylindrical body is inserted in the straight holder so as to be movable in the axial direction, and the cooling pipe support member is movable in the axial direction of the straight holder and fixable at any position by engaging the long groove portion provided on the outer peripheral wall of the cylindrical body with the locking bolt screwed on the side face of the straight holder, so that the tip of the cooling pipe can be easily adjusted to the position proximate to the inner surface of the electrode and can also be easily fixed and held in that position.

With the invention according to claim 4, the cooling pipe support member includes: the base provided with the supply port for the cooling water; and the fixing member that is fixed to the lower part of the straight holder separately from the base and that penetrates and supports the cooling pipe, in which the fixing member is provided with the discharge port for the cooling water, and the cooling pipe support member is movable in the axial direction of the straight holder and fixable at any position by providing the lock mechanism at the lower portion of the fixing member with the ring-type steel pipe joint structure that uses the compression ring to fix the cooling pipe at any position, so that the tip of the cooling pipe can be easily adjusted to the position proximate to the inner surface of the electrode and can also be easily fixed and held in that position.

DETAILED DESCRIPTION OF THE INVENTION

In the following, preferred embodiments of the present invention are described with reference to the drawings.

Figure 1:
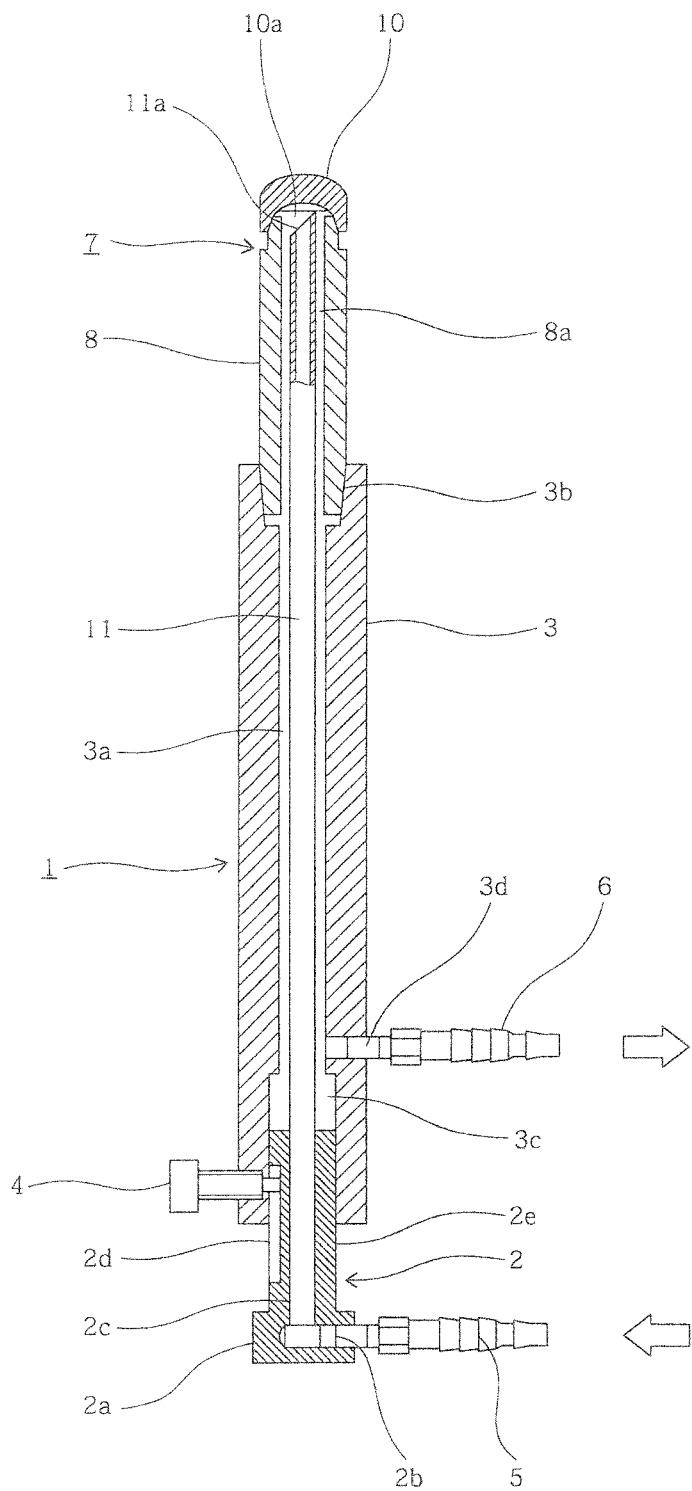
FIG. 1 is a sectional view of an embodiment according to the present invention.

FIG. 1 is a sectional view of an electrode device for spot welding according to a first embodiment of the present invention. In FIG. 1, reference numeral 1 denotes a device body that includes an electrode 7 and the straight holder 3 connected with each other in a straight line, the electrode 7 including a cap tip 10 placed on the tip of a shank 8 having a cylindrical shape, the straight holder 3 having a cylindrical shape. The shank 8 and the cap tip 10 may be molded in one piece. A cooling pipe 11 is inserted inside the device body 1 from the lower side of the device body 1 and a tip opening 11a of the cooling pipe 11 is positioned proximate to the back side of the cap tip 10.

Cooling water ejected from the tip opening 11a of the cooling pipe 11 cools the cap tip 10, flows through the gap between the outer peripheral surface of the cooling pipe 11 and the inner peripheral surface of the shank 8 and the gap between the outer peripheral surface of the cooling pipe 11 and the inner peripheral surface of the straight holder 3, and then is discharged outside from a lower part of the straight holder 3.

A cooling pipe support member 2 provided with a supply port 2b for the cooling water is positioned at a lower part of the device body 1, and the cooling pipe support member 2 supports a base end of the cooling pipe 11. By moving the position of the cooling pipe support member 2 with respect to the axial direction of the device body 1, the tip opening 11a of the cooling pipe 11 is adjusted to be positioned in the proximity of the inner surface of the electrode, thereby cooling the cap tip 10 efficiently.

The cooling pipe support member 2 also serves as a lid to seal the lower end of the straight holder 3.

The cooling pipe support member 2 has a supply port 2b for the cooling water formed on the side of the base 2a at the base end, a communicating tube 2c is formed to connect the tip opening with a supply port 2b for the cooling water, and a long groove 2d is formed on the outer surface of the communicating tube 2c in the axial direction. A cylindrical body 2e is erected on top of the base 2a.

Large diameter portions 3b, 3c are formed at ends of a through hole 3a of the straight holder 3, and a discharge port 3d for the cooling water is formed on the side proximate to the large diameter portion 3c at the base end. A locking bolt 4 is screwed on the side of the large diameter portion 3c at the position corresponding to the long groove 2d, and by tightening the locking bolt 4 and pressing the tip against the bottom face of the long groove 2d, the straight holder 3 is fixed to the cooling pipe support member 2.

In FIG. 1, reference numerals 5 and 6 denote connectors for connecting cooling water hoses (not illustrated) to the supply port 2b and discharge port 3d.

Figure 2:
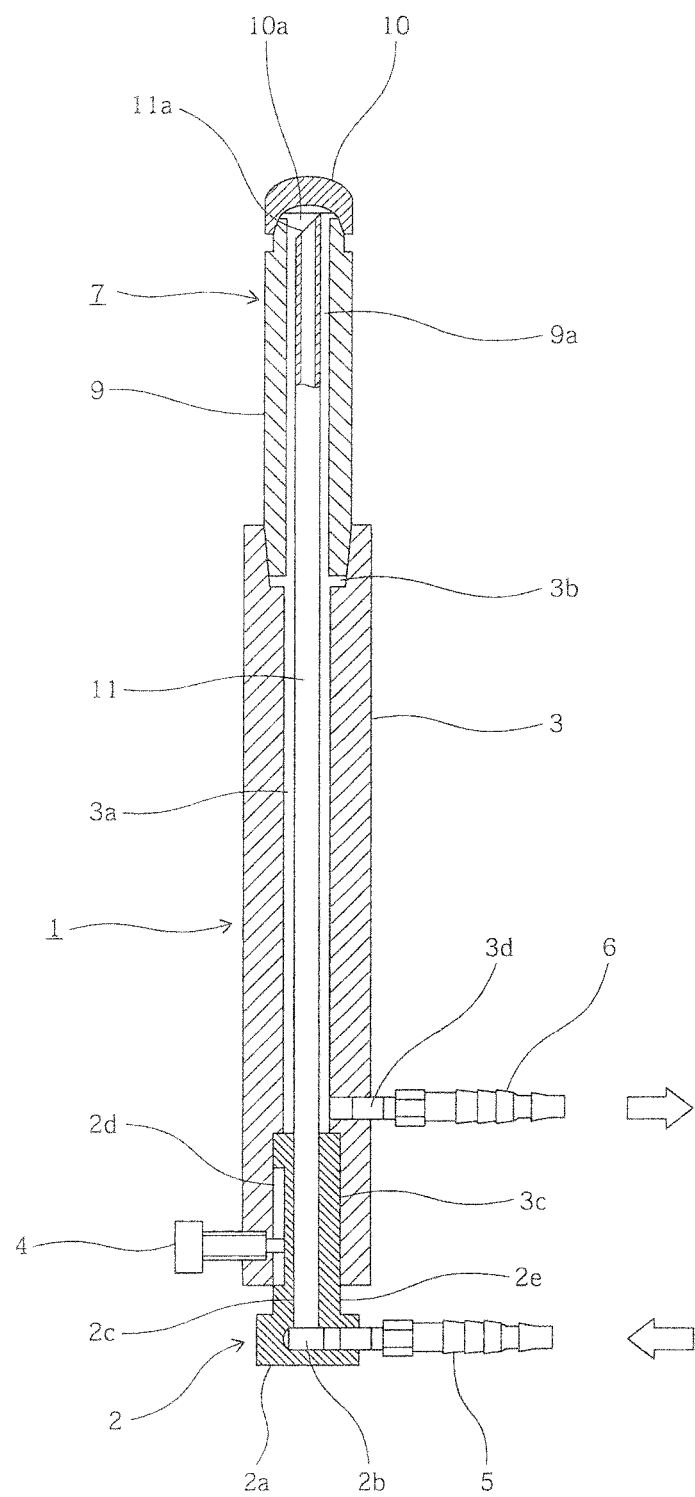
FIG. 2 is a sectional view of the embodiment in which a shank with a different length from that in FIG. 1 is attached.

In FIG. 1, reference numeral 7 denotes an electrode. The electrode 7 includes a shank 8 having a cylindrical shape and a cap tip 10 mounted on the tip of the shank 8. FIG. 2 illustrates a shank 9 that is a longer type than the shank 8. The shank 8 or 9 is mounted by press-fitting the base end into the large diameter portion 3b at the tip of the through hole 3a in the straight holder 3, and the cap tip 10 is mounted on the shank 8 or 9 by press-fitting the tip of the shank 8 or 9 into a mounting hole 10a, which is open at the base end.

Reference numeral 11 denotes a cooling pipe with the tip cut off at an angle. The cooling pipe 11 is mounted by press-fitting the base end into the communicating tube 2c of the cooling pipe support member 2, passes through the through hole 3a of the straight holder 3, and a through-hole 8a of the shank 8 or a through-hole 9a of the shank 9, and is positioned so that the tip opening 11a is in the mounting hole 10a of the cap tip 10 and in the vicinity of the cap tip 10.

As described above, the cooling pipe support member 2 illustrated in FIG. 1 includes: the base 2a provided with the supply port 2b for the cooling water on the side face; and the cylindrical body 2e erected on the base, in which the cylindrical body 2e is inserted in the straight holder 3 so as to be movable in the axial direction, and the cooling pipe support member 2 is movable in the axial direction of the straight holder 3 and fixable at any position by engaging the long groove 2d provided on the outer peripheral wall of the cylindrical body 2e with the locking bolt 4 screwed on the side face of the straight holder 3.

The following describes a method for cooling the cap tip 10 with the electrode device.

The cooling water is supplied through the supply port 2b of the cooling pipe support member 2, flows through the cooling pipe 11, and then is ejected from the tip toward inside the cap tip 10 to cool the cap tip 10. The cooling water then passes through the gap between the outer peripheral surface of the cooling pipe 11 and the inner peripheral surface of the shank 8 or 9, then through the gap between the outer peripheral surface of the cooling pipe 11 and the inner peripheral surface of the straight holder 3, and is discharged outside through the discharge port 3d. The cooling water is circulated in the same manner to cool the cap tip 10, and this maintains the form of the cap tip 10 stably for a long time, preventing the occurrence of welding failure.

The following describes a case where the shank 8 is replaced with the shank 9, which is longer than the shank 8.

The shank 8 with the cap tip 10 is removed from the state illustrated in FIG. 1, and the new shank 9 is installed as a replacement. If the shank 9 is attached as is, the cap tip 10 will be positioned higher by the length of the shank 9 longer than the shank 8 and will be farther away from the tip of the cooling pipe 11. As a result, the inside of the cap tip 10 is less likely to be exposed to fresh cooling water, and the cooling effect of the cap tip 10 is inferior to that with the shank 8.

In the present invention, as illustrated in FIG. 2, the bolt 4 is loosened and the cooling pipe support member 2 is moved upward by the length of the shank 9 longer than the shank 8, and then the bolt 4 is tightened to fix the straight holder 3 at this position. Although the shank 9 is longer than the shank 8, the position of the tip of the cooling pipe 11 has been moved upward by the length of the shank 9 longer than the shank 8, making the positional relationship between the inside of the cap tip 10 and the tip of the cooling pipe 11 same as that of the shank 8, resulting in sufficient cooling.

Accordingly, even the lengths of the shanks 8 and 9 are different, the distance between the inside of the cap tip 10 and the tip of the cooling pipe 11 can be brought closer together for efficient cooling in either case. In addition, the position of the cooling pipe 11 can be changed easily and accurately.

The second embodiment is now described with reference to FIG. 3 to FIG. 5.

Figure 3:
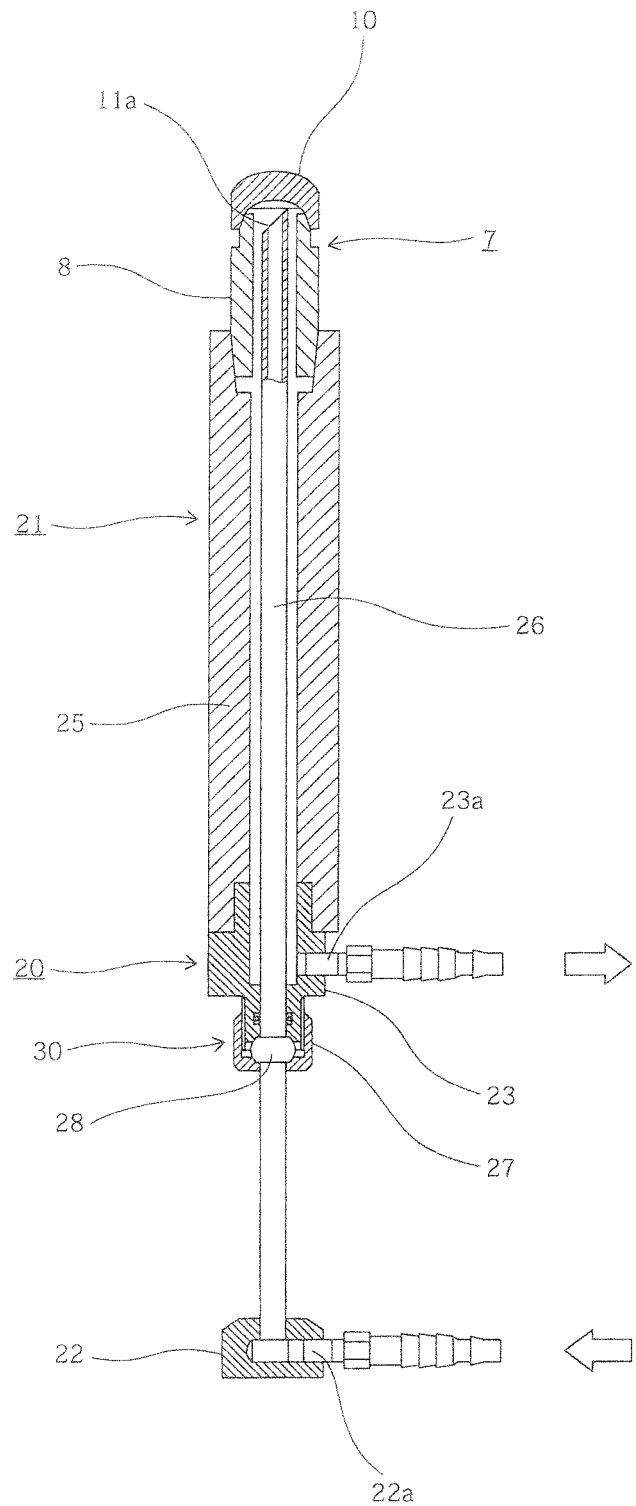
FIG. 3 is a sectional view of another embodiment.

In FIG. 3, 21 is a device body that includes a cooling pipe support member 20 and a straight holder 25. The cooling pipe support member 20 includes: a base 22 that supports the base end of a cooling pipe 26, and a fixing member 23 that is fixed to a lower part of a straight holder 25 separately from the base 22 and that penetrates and supports the cooling pipe 26. A supply port 22a for the cooling water is provided on the side face of the base 22, and a discharge port 23a for the cooling water is provided on the side face of the fixing member 23.

The lower part of the fixing member 23 is provided with a lock mechanism 30 having a ring-type steel pipe joint structure that uses an annular compression ring 28 to fix the cooling pipe 26 in any position, so that the cooling pipe support member 20 is movable in the axial direction of the straight holder 25 and fixable at any position.

The following describes the lock mechanism 30.

Figure 5:
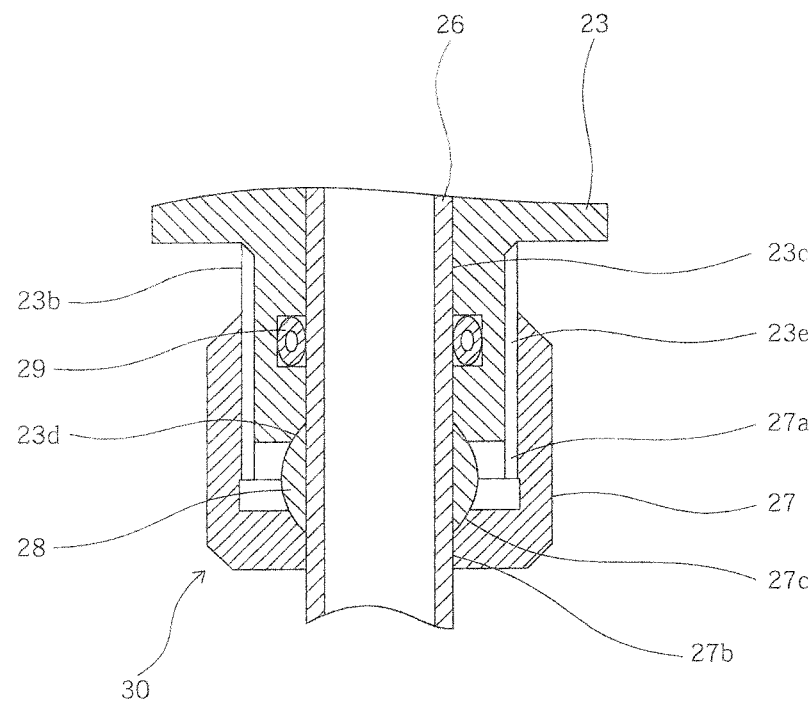
FIG. 5 is an enlarged sectional view of a lock mechanism.
Figure 6:
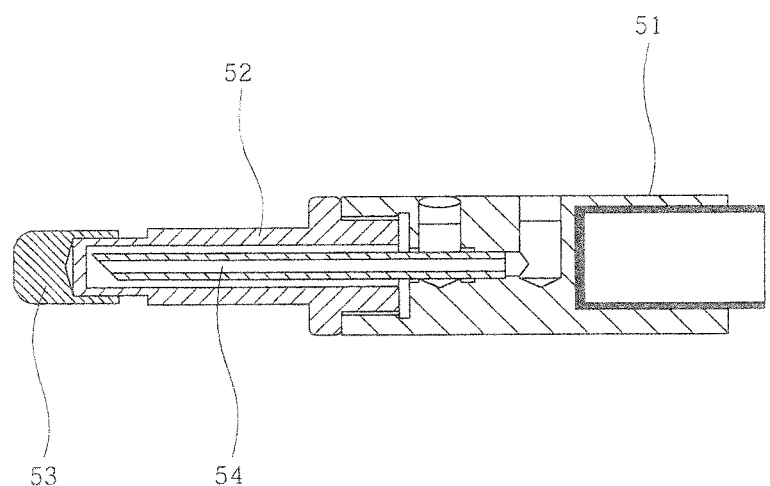
FIG. 6 is a sectional view of a related art example.

As illustrated in FIG. 5, the base end of the fixing member 23 to which the straight holder 25 is attached has a small diameter portion 23b, and the base end of a through hole 23c, which has a slightly larger diameter than that of the cooling pipe 26, has a slant portion 23d in an arc shape corresponding to the outer peripheral arc of the annular compression ring 28. The fixing member 23 has a threaded portion 23e formed on the outer surface of the base end, and the threaded portion 23e can be screwed into a nut member 27, which is U-shaped in section and has an inner side surface serving as a threaded portion 27a. The cooling pipe 26 penetrates through the fixing member 23, the compression ring 28, and the nut member 27. The nut member 27 moves to the base end of the fixing member 23 by tightening the nut member 27, so that the compression ring 28 is fixed tightly to the cooling pipe 26, thereby firmly fixing the cooling pipe 26 and maintaining airtightness. On the other hand, by loosening the nut member 27, the compression ring 28 is released from the tight contact, allowing the fixing member 23 to move freely in the vertical direction. Note that 29 is an O-ring that has a hollow body to maintain airtightness.

The following describes a case where the shank 8 is replaced with the shank 9, which is longer than the shank 8.

Figure 4:
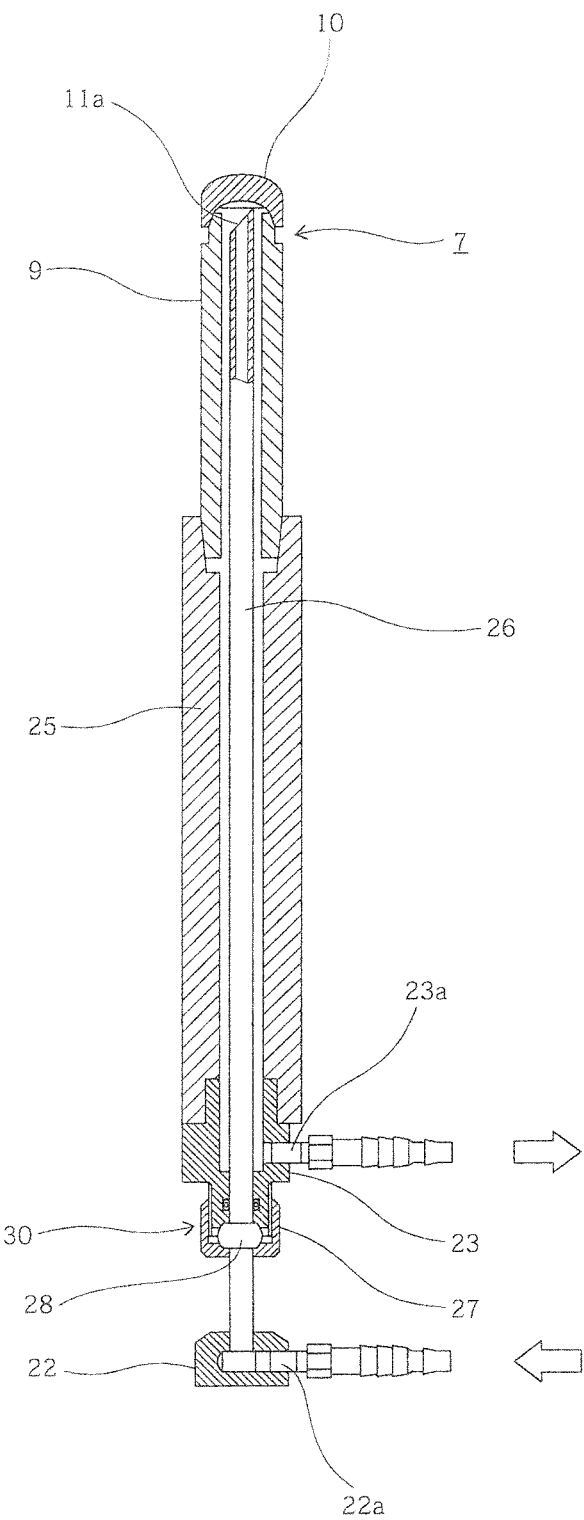
FIG. 4 is a sectional view of the embodiment in which a shank with a different length from that in FIG. 3 is attached.

In the state illustrated in FIG. 3, if the new shank 9 in FIG. 4 is merely attached, the cap tip 10 is positioned higher by the length of the shank 9 longer than the shank 8, making the cooling effect of the cap tip 10 inferior to that with the shank 8, which is the same as the aforementioned embodiment.

In a second embodiment, as illustrated in FIG. 4, after a nut member 27 is loosened and the compression ring 28 is released from the tight contact, a base 22 is moved upward by the length of the shank 9 longer than the shank 8, and then the nut member 27 is tightened to fix the fixing member 23 at this position. Although the shank 9 is longer than the shank 8, the position of the tip of the cooling pipe 26 has been moved upward by the length of the shank 9 longer than the shank 8. Therefore, the position relationship between the inside of the cap tip 10 and the tip of the cooling pipe 26 is the same as that of the shank 8, resulting in sufficient cooling.

Accordingly, even the lengths of the shanks 8 and 9 are different, the positional relationship between the inside of the cap tip 10 and the tip of the cooling pipe 26 can be made closer for efficient cooling in either case. In addition, the position of the base 22 can be changed easily and accurately only by loosening or tightening the nut member 27 of the lock mechanism 30.

As is obvious from the above description, the present invention is a resistance welding electrode device with a structure in which the electrode is cooled with cooling water, and the electrode attached to the cooling pipe is movable in the axial direction, allowing the discretionary positional adjustment of a water-cooling end inside the inner face of the electrode in a very simple manner, efficient circulation of cooling water to the proximity of the tip of the electrode, thereby maintaining the form of the electrode tip stably for a long period of time, reducing occurrence of welding failure. In addition, the electrode position can be adjusted easily and accurately by moving the straight holder.

REFERENCE SIGNS LIST 1 device body
2 cooling pipe support member
2a base portion
2b supply port 2c communicating tube
2d long groove
2e cylindrical body
3 straight holder
3a through hole
3b large diameter portion
3c large diameter portion
3d discharge port
4 locking bolt
5 connector
6 connector
7 electrode
8 shank
8a through hole
9 shank
9a through hole
10 cap tip
10a mounting hole
11 cooling pipe
11A tip opening
20 cooling pipe support member
21 device body
22 base
22a supply port
23 fixing member
23a discharge port
23b small diameter portion
23c through hole
23d slant portion
23e threaded portion
25 straight holder
26 cooling pipe
27 nut member
27a threaded portion
27b through hole
27c slant face
28 compression ring
29 O-ring
30 lock mechanism
51 holder
52 shank
53 cap tip
54 cooling pipe

The invention claimed is:

1. An electrode device comprising:
a device body that includes an electrode and a straight holder, connected with each other in a straight line, the electrode including a cap tip placed on a tip of a shank having a cylindrical shape, and the straight holder having a cylindrical shape; and
a cooling pipe inserted inside the device body from a base end of the device body opposing the cap tip, the cooling pipe having a tip opening located proximate to the cap tip,
wherein cooling water ejected from the tip opening of the cooling pipe cools the cap tip, flows through a gap between an outer peripheral surface of the cooling pipe and inner peripheral surfaces of the shank and the straight holder, and then is discharged to an outside of the device from a discharge port of the straight holder proximate to the base end of the device body,
wherein the cooling pipe is movable in an axial direction of the device body and fixable at any position,
wherein a cooling pipe support member, provided with a supply port for the cooling water, is positioned proximate the base end of the device body,
wherein the cooling pipe support member supports a base end of the cooling pipe,
wherein the cooling pipe support member comprises
a base provided with a supply port for the cooling water, and
a cylindrical body erected on the base,
wherein the cylindrical body is located within the straight holder and is movable in an axial direction, and
wherein the cooling pipe support member is movable in the axial direction of the straight holder and fixable at any position by engaging a long groove portion provided on an outer peripheral wall of the cylindrical body with a locking bolt screwed on a side face of the straight holder.

2. An electrode device comprising:
a device body that includes an electrode and a straight holder, connected with each other in a straight line, the electrode including a cap tip placed on a tip of a shank having a cylindrical shape, and the straight holder having a cylindrical shape; and
a cooling pipe inserted inside the device body from a base end of the device body opposing the cap tip, the cooling pipe having a tip opening located proximate to the cap tip,
wherein cooling water ejected from the tip opening of the cooling pipe cools the cap tip, flows through a gap between an outer peripheral surface of the cooling pipe and inner peripheral surfaces of the shank and the straight holder, and then is discharged to an outside of the device from a discharge port of the straight holder proximate to the base end of the device body,
wherein the cooling pipe is movable in an axial direction of the device body and fixable at any position,
wherein a cooling pipe support member, provided with a supply port for the cooling water, is positioned proximate the base end of the device body,
wherein the cooling pipe support member supports a base end of the cooling pipe,
wherein the cooling pipe support member comprises
a base provided with a supply port for the cooling water, and
a fixing member, having a first end that is fixed to a base part of the straight holder separately from the base and that penetrates and supports the cooling pipe,
wherein the fixing member is provided with a discharge port for the cooling water, and
wherein the cooling pipe support member is movable in the axial direction of the straight holder and fixable at any position by providing a lock mechanism at a an opposed second end of the fixing member, the lock mechanism having a ring-type steel pipe joint structure that uses an compression ring to fix the cooling pipe at any position.

* * * * *